United States Patent Office.

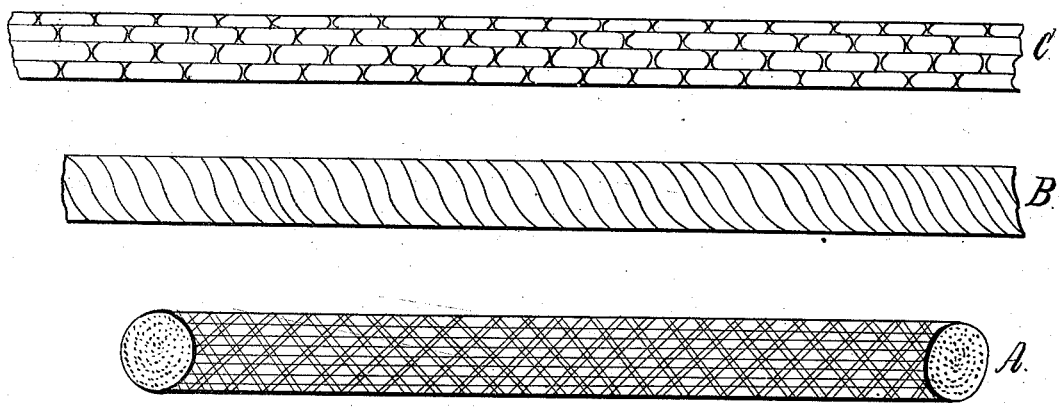

WILLIAM HARTLEY MILLER, OF PHILADELPHIA, PENNSYLVANIA.

Letters Patent No. 77,902, dated May 12, 1868.

IMPROVEMENT IN THE MANUFACTURE OF PACKING FOR STEAM-ENGINES, &c.

*The Schedule referred to in these Letters Patent and making part of the same.*

TO ALL WHOM IT MAY CONCERN:

Be it known that I, WILLIAM HARTLEY MILLER, of Philadelphia, in the county of Philadelphia, and State of Pennsylvania, have invented a new and improved Method of Applying Oil, Liquid Grease, or Wax, to Packing for Stuffing-Boxes of Engines and Pumps; and I hereby declare that the following is a full, clear, and exact description thereof, reference being had to the accompanying drawings, making part of this specification, The nature of my invention consists in the use of oil, liquid grease, or wax, in combination with dry powdered and dry fibrous material, by a process which secures the said powdered and fibrous material from the effects of water or condensed steam.

To enable others skilled in the art to make and use my invention, I will proceed to describe its construction and mode of operation.

A and B, in the drawings, represent sections of the ordinary combination of dry powdered with dry fibrous material, in the usual form of packing-rope, after having been saturated with oil, melted grease, or wax, in the manner and for the purpose herein more specifically set forth.

Having the fibrous material spun into yarn or thread, I spool the yarn, and place it in a spool-rack. The spools, rack, and spooling-machine used are an exact counterpart of machinery and appliances used in cotton-mills for putting yarn upon spools for weaving, warping, or other purposes.

Having placed a tank or other reservoir within a few yards of the spool-rack, or "creel," (as it is sometimes called,) I fill the reservoir with dry powdered substance to about one-half the capacity of the said reservoir; and, in order to secure the combination of this dry powder with the dry fibrous threads as they are united in rope, by being led from the spool-rack into the reservoir, and thence to a twisting-apparatus, I now add to the dry powder a lubricating-oil, liquid grease, or wax, using steam-heating apparatus to melt and keep the compound warm. It is necessary that the wax should be kept nearly up to the boiling-point, thus securing a thorough mixing of the powder, fibre, and oil, grease, or wax, and rendering the combination secure from the effects of water in pumps, and condensed steam in steam stuffing-boxes.

In some instances, I prefer a process somewhat as follows, viz: Having the rope formed of dry powdered and dry fibrous material partially secured by a cover, after the manner shown in the patent of J. B. Miller and W. H. Miller, dated April 4, 1865, I fill the reservoir above alluded to with oil, grease, or wax, or a combination of oil and wax, or of oil and water, and, having the lubricant boiling hot, I immerse the above-described dry rope in the reservoir, which process unites the fibre, powder, and oil.

Either of the above processes secures the combination of wax or oil through the entire body of the rope; and this oil, wax, or grease prevents the water from washing out the powder, and hence adds greatly to the security of the joint.

What I claim as my invention, and desire to secure by Letters Patent, is—

The process above described, or its substantial equivalent, whereby the combination of dry powdered and dry fibrous material may be secured from the effects of water or condensed steam.

WM. HARTLEY MILLER.

Witnesses:
E. W. MILLER,
E. CONOLLY.